(12) United States Patent
Maier et al.

(10) Patent No.: US 7,974,767 B2
(45) Date of Patent: Jul. 5, 2011

(54) METHOD FOR DETECTING OPERATING PARAMETERS OF A POWER TOOL COMPRISING AN INTERNAL COMBUSTION ENGINE

(75) Inventors: Georg Maier, Kernen i. R. (DE); Wolfgang Layher, Waiblingen (DE); Mohamed Abou-Aly, Waiblingen (DE); Heinrich Leufen, Schwaikheim (DE); Eberhard Schieber, Backnang (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 994 days.

(21) Appl. No.: 11/838,278

(22) Filed: Aug. 14, 2007

(65) Prior Publication Data
US 2008/0042643 A1    Feb. 21, 2008

(30) Foreign Application Priority Data

Aug. 16, 2006   (DE) .................... 10 2006 038 283

(51) Int. Cl.
*F02B 77/08*   (2006.01)
*G06F 19/00*   (2011.01)
*F02P 5/15*   (2006.01)
*G01M 15/00*   (2006.01)

(52) U.S. Cl. ............ 701/110; 123/406.58; 123/149 D; 701/115; 73/114.25; 702/66; 702/190

(58) Field of Classification Search .......... 123/317, 123/319, 352, 376, 403, 406.58, 406.59, 123/438, 406.53, 406.56, 612, 617, 149 A, 123/149 D, 149 F; 701/101–103, 109, 110, 701/114–115; 73/114.25–114.28; 702/64, 702/57, 66, 69–74, 142, 145–147, 182, 183, 702/189, 190; 324/166, 167, 172, 384

See application file for complete search history.

(56) References Cited

U.S. PATENT DOCUMENTS

| | | | | |
|---|---|---|---|---|
| 4,461,151 A * | 7/1984 | Kanesaka | ..................... | 60/611 |
| 4,510,569 A * | 4/1985 | Takao et al. | ................ | 701/115 |
| 4,597,368 A * | 7/1986 | Ament | .................... | 123/339.2 |
| 4,633,838 A * | 1/1987 | Fukui | ........................ | 123/488 |
| 4,648,367 A * | 3/1987 | Gillbrand et al. | ...... | 123/406.26 |
| 4,679,536 A * | 7/1987 | Morita | ................... | 123/406.22 |
| 4,995,348 A * | 2/1991 | Melchior | ............... | 123/65 VD |
| 5,047,943 A * | 9/1991 | Takahata et al. | .......... | 701/101 |
| 5,440,877 A * | 8/1995 | Kamura et al. | ............. | 60/274 |
| 5,544,636 A * | 8/1996 | Geiger et al. | ............. | 123/478 |
| 5,640,847 A * | 6/1997 | Nakajima et al. | ........... | 60/276 |
| 5,826,563 A * | 10/1998 | Patel et al. | ................ | 123/481 |
| 6,125,824 A * | 10/2000 | Klare et al. | ............... | 123/476 |
| 6,170,462 B1 * | 1/2001 | Kondo | .................... | 123/406.18 |
| 6,224,021 B1 * | 5/2001 | Tanaka | ...................... | 244/221 |
| 6,230,096 B1 * | 5/2001 | Nishimoto | ................ | 701/113 |

* cited by examiner

*Primary Examiner* — Willis R Wolfe, Jr.
*Assistant Examiner* — Johnny H Hoang
(74) *Attorney, Agent, or Firm* — Gudrun E. Huckett (57) ABSTRACT

In a method for detecting an operating parameter of a power tool having an internal combustion engine with a cylinder, a piston delimiting a combustion chamber in the cylinder and driving a crankshaft supported rotatably in a crankcase, an intake supplying combustion air to the combustion chamber, an exhaust removing combustion gases from the combustion chamber, and a signal generator driven in rotation by the crankshaft emitting sequential alternating voltage signals, a period duration of the voltage signal is selected to correspond to the n-th portion of a crankshaft revolution with n greater than 2. The n-th portion of the crankshaft revolution provides a crankshaft angle interval. For each crankshaft angle interval at least one information is detected that represents a course plotted against the crankshaft angle. The course is scanned with regard to characteristic features that are correlated with an operating parameter of the power tool.

28 Claims, 8 Drawing Sheets

FIG. 18

METHOD FOR DETECTING OPERATING PARAMETERS OF A POWER TOOL COMPRISING AN INTERNAL COMBUSTION ENGINE

BACKGROUND OF THE INVENTION

The invention relates to a method for detecting an operating parameter of a power tool comprising an internal combustion engine, in particular, of a portable, hand-held power tool with a reciprocating piston engine such as a two-stroke engine, a four-stroke engine or the like. The internal combustion engine comprises at least one cylinder and a crankcase, and a combustion chamber is defined in the cylinder and delimited by a piston, wherein the piston drives in rotation a crankshaft supported rotatably in the crankcase. An intake is provided that supplies combustion air to the combustion chamber and an exhaust is provided for removing combustion gases from the combustion chamber. A signal generator is provided that is driven in rotation by the crankshaft and emits sequential alternating voltage signals for one crankshaft revolution.

Modern internal combustion engines as they are used e.g. in connection with hand-held portable power tools are controlled by complex ignition devices that take into consideration different operating parameters of the internal combustion engine. These different operating parameters of the internal combustion engine must be provided to the control unit for which purpose engine speed sensors, throttle sensors, load sensors, knocking sensors and other devices are required. The plurality of sensors is technically complex, expensive, and entails many error sources. In addition, the required cable arrangement is problematic because in case of small-size power tools with internal combustion engines considerable thermal loads occur.

SUMMARY OF THE INVENTION

It is an object of the present invention to provide a method for detecting operating states of a reciprocating piston engine which method allows to reduce the number of sensors in an internal combustion engine.

In accordance with the present invention, this is achieved in that the period duration of a voltage signal corresponds to the n-th portion of a crankshaft revolution with n being a number greater than 2, wherein the n-th portion of the crankshaft revolution defines a crankshaft angle interval and for each crankshaft angle interval at least one information is detected, wherein the information of the crankshaft angle interval represents a course plotted against the crankshaft angle, and wherein the course derived from the at least one information is scanned with regard to characteristic features and a characteristic feature is correlated with (assigned to) an operating parameter of the power tool.

The basic principle of the invention resides in that as many as possible of the operating parameters of an internal combustion engine are to be derived from the voltage signal of an alternator, which voltage signal is moreover used for supplying energy to electrical consumers, in particular, the ignition.

Firstly, it is provided that the period duration of the alternating voltage signal is to be selected such that it corresponds to the n-th portion of a crankshaft revolution. A complete crankshaft revolution is thus divided into crankshaft angle intervals wherein each crankshaft angle interval is a part of a complete crankshaft revolution. For each crankshaft angle interval at least one information is detected wherein the information obtained in this way represents a course across the crankshaft angle. This new curve derived from the alternating voltage signal of the generator is scanned with regard to characteristic features and a detected characteristic feature is correlated with an operating parameter of the power tool.

Advantageously, the information is at least one interval engine speed of a crankshaft angle interval and the interval engine speeds are plotted, directly or indirectly, as an engine speed course against at least one complete revolution of the crankshaft. The thus obtained engine speed course represents in digitalized form the information of the alternating voltage signal. In accordance with the invention, the engine speed course is the result of the transformation of the analog alternating voltage signal into a digital information signal. This digital information signal is then scanned with regard to characteristic features in order to correlate a detected characteristic feature to an operating parameter. In general, according to the invention the curve of the information (e.g. interval engine speeds) is to be scanned for characteristic features and an operating parameter of the power tool and/or of the internal combustion engine is to be correlated with or assigned to a characteristic feature, respectively.

It has been found that with the method according to the invention many operating parameters of the power tool and/or of the internal combustion engine can be safely determined. For example, as an operating parameter of the power tool the load on the tool, the operating state of a heater, the operating state of a valve of the power tool, the wear state of a tool, or the like can be determined without using sensors that are especially adapted for detecting the operating parameter. For an internal combustion engine, it is possible to derive, for example, the crankshaft angle position, the operating load, the throttle position of a carburetor, the course of combustion, the richness of the fuel/air mixture or similar parameters from the information signal.

It is noteworthy that, in accordance with the present invention, as the crankshaft begins to rotate, independent of the angle position of the crankshaft, the engine speed course of the interval engine speeds can be derived and evaluated. In order to recognize characteristic features and thus operating parameters, a complete crankshaft revolution is not necessary. In many cases, it is instead sufficient when a few crankshaft angle intervals or their correlated interval engine speeds within one crankshaft revolution are evaluated.

The method according to the invention is advantageous in particular in connection with internal combustion engines without battery because, upon rotation of the alternating current generator, the resulting electrical energy can be used for starting the control electronics and, therefore, the method for recognizing the operating parameters of the power tool can be initiated with the first alternating voltage signals of the alternating current generator.

The plurality of operating parameters to be derived from the alternating voltage signal opens up the possibility to supply in a simple way the operating parameters to a diagnostic and/or servicing device for evaluation wherein operating parameters can be selected and saved in a non-volatile data memory of the diagnostic and servicing device. Such data can be utilized advantageously in a shop for servicing the power tool.

In an advantageous further embodiment of the method, two interval engine speeds are calculated for each crankshaft angle interval. Because the alternating voltage signal changes its polarity once within each crankshaft angle interval as a result of the pole division of the alternating current generator, there are three zero positions. Each crankshaft angle interval can therefore be divided simply into two zero position intervals so that, for example, six crankshaft angle intervals provide twelve zero position intervals. A zero position interval is determined by the time interval between two sequential zero crossings of the voltage signal. Because of the pole division, a fixed mechanical crankshaft angle spacing between two zero positions is known so that in a simple way, based on the known mechanical spacing of the zero positions and the time interval between neighboring zero positions, the corresponding zero position interval can be calculated relative to an interval engine speed. The zero positions are advantageously determined when the alternator is free of load. For this purpose, the current flow to an electric consumer connected to the alternator is stopped or interrupted at the time a zero crossing occurs. In this way, signal displacements caused by inductivity or capacitance are safely prevented. It was found to be advantageous to keep the alternator load-free in an angle range of from approximately 5° CA before zero crossing to approximately 1° CA after zero crossing, that is to switch off the load, for example.

The number n of the division of a crankshaft revolution is maximally 12, advantageously 4 to 8. Optimal values result for a number n of 5 to 7, wherein in the illustrated embodiment the number n is selected to be 6.

The engine speed course of the interval engine speeds can be scanned with regard to a pronounced engine speed minimum for determining a certain crankshaft angle position, for example, the position of the piston at the top dead center. In the crankshaft angle interval of the engine speed minimum, the piston is positioned approximately at top dead center. For a quicker determination of the crankshaft angle position the polarity of the voltage signal in the crankshaft angle interval can be evaluated. For twelve zero crossings, the system can correlate the angle position to the crankshaft for a known zero crossing only within a 30° raster. Accordingly, twelve different crankshaft angle positions are possible. When the direction of the zero crossing, i.e., the polarity of the half wave of the alternating voltage, is additionally taken into account, the twelve zero crossings can be differentiated into six positive and six negative zero crossings, respectively. For a concrete zero crossing, a raster of 60° CA angle correlation is thus possible so that a quicker determination of the crankshaft angle position can be obtained.

Expediently, the adjustment is chosen such that a zero crossing $O_i$ of the induced alternating voltage signal is preferably approximately 15° CA before top dead center of the piston. In this way, it is ensured that the system can correlate early on the position of the alternating voltage signal to the angle position of the crankshaft so that the starting conditions are improved.

DESCRIPTION OF THE PREFERRED EMBODIMENTS

Figure 1:
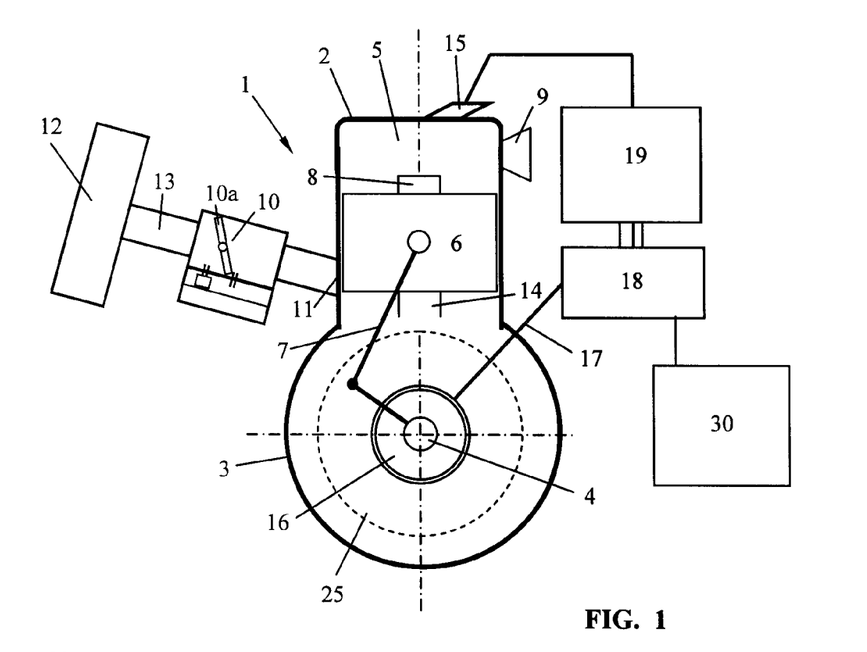
FIG. 1 is a schematic illustration of an internal combustion engine.

The schematic illustration of FIG. 1 illustrates a single-cylinder internal combustion engine 1, in particular a two-stroke engine. The method according to the invention is however not limited to the use in a single-cylinder or multi-cylinder two-stroke engine. The method can also be used for detecting operating parameters for a single-cylinder or multi-cylinder four-stroke engine or a similar reciprocating piston engine.

FIG. 1 shows the internal combustion engine 1 comprised of a cylinder 2 and crankcase 3 in which a crankshaft 4 is supported rotatably. In the cylinder 2 a combustion chamber 5 is formed that is delimited by a reciprocating piston 6. The piston 6 is connected by means of connecting rod 7 to crankshaft 4 in the crankcase 3 and drives the crankshaft 4 in rotation. In the illustrated embodiment, an intake 8 for combustion air opens into the combustion chamber 5 wherein the intake 8 is the port of a transfer passage 14. Moreover, an exhaust 9 is provided through which the combustion gases are exhausted from the combustion chamber 5.

Combustion air and fuel are supplied to the internal combustion engine 1 through carburetor 10 wherein the mixture intake 11 opens into the crankcase 3. The combustion air is supplied through air filter 12, the intake passage 13, and the carburetor 10 to the mixture intake 11 and is sucked into the crankcase 3 as the piston 6 moves upwardly. When the piston 6 moves downwardly, the mixture contained in the crankcase 3 is guided through the transfer passage 14 to the intake 8 and flows into the combustion chamber 5. As the piston moves upwardly, the taken-in mixture is compressed and ignited by a spark plug 15. The expanding combustion gases drive the piston 6 downwardly so that the exhaust 9 is opened and the combustion gases are exhausted. The amount of incoming combustion air is controlled by the pivotable throttle valve 10a.

In the illustrated embodiment, a signal generator 16 is fixedly connected to the crankshaft 4 wherein the induced voltage signals are supplied by a line 17 to the signal processing unit 18. The signal processing unit 18 is connected to the ignition device 19 that controls the spark plug 15.

Figure 2:
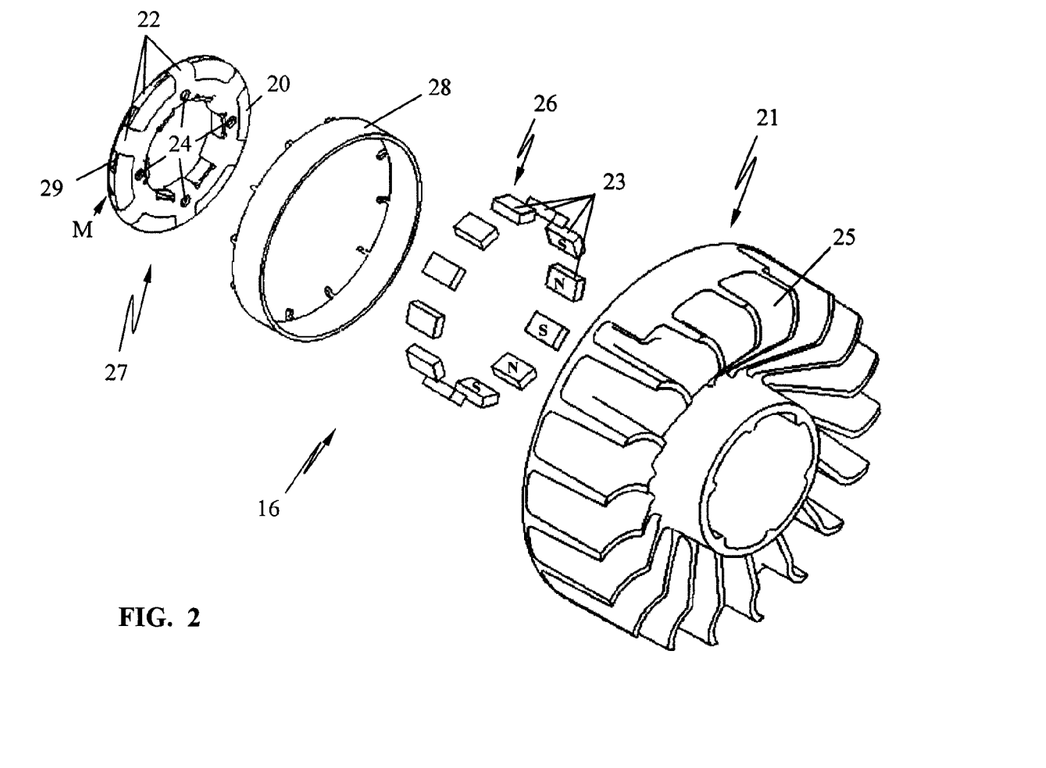
FIG. 2 is a perspective exploded view of a configuration of a signal generator driven in rotation by the crankshaft and shown in the form of a claw pole alternator.

As illustrated in FIG. 2, the signal generator 16 can be configured as an alternating current generator, e.g. as a so-called claw pole alternator (FIG. 2) or as a radial alternator (FIG. 18), comprising a fixedly attached coil body 20 of a stator 27 that is connected by fastening openings 24, for example, to the crankcase 3 (FIG. 1) of the internal combustion engine. In the illustrated embodiment, the rotor 21 of the claw pole alternator is provided on the fan wheel 25 of the cooling air supply of the internal combustion engine 1 that supports at its periphery twelve permanent magnets 23 that are positioned with alternating polarity N, S adjacent to one another. The permanent magnets 23 are correlated with a support ring 28 which can also be configured as a magnetic return element (magnetic yoke). The stator 27 has twelve poles 22 by means of which the magnetic circuit of the circulating permanent magnets 23 is effected. Upon rotation of the crankshaft 4 and thus of the rotor 21 an alternating magnetic flux will be generated in the coil 29 of the coil body 20 causing corresponding induced alternating voltage signals that are tapped at the coil ends. A generally known magnetic ring with Halbeck magnetization can be advantageous.

The coil body 20 is secured as stator 27 on the crankcase 3 wherein the angle position of the stator 27 and thus of the individual poles 22 is matched to a certain position of the piston 6. In this connection, it can be expedient to orient the angle position of the stator such that the induced voltage has a zero crossing when, for example, the exhaust 9 is opened, the piston 6 is at top dead center, or the intake 8 is opened.

Figure 3:
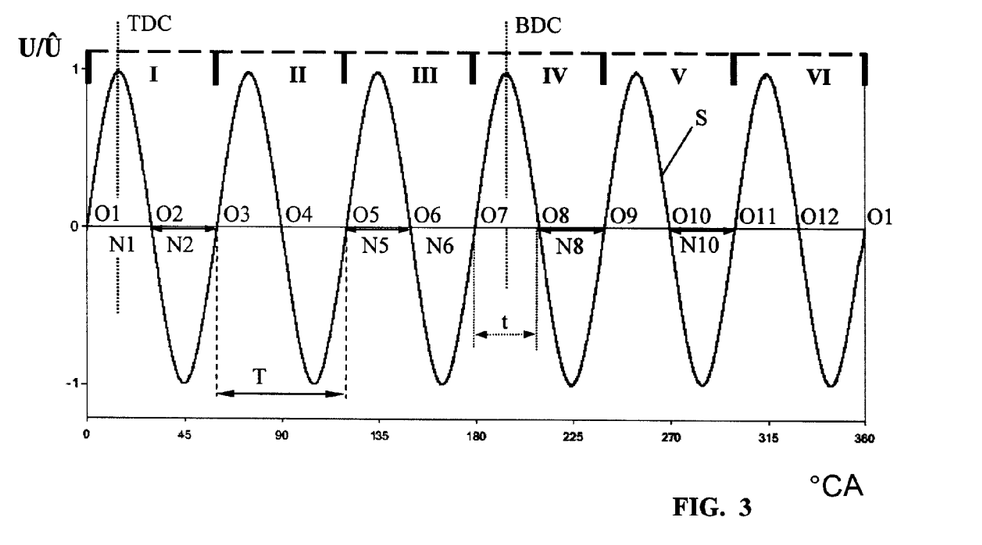
FIG. 3 shows an idealized voltage course of a multi-pole alternator, plotted against the crankshaft angle.

An idealized voltage course of an alternating voltage generator 16 according to FIG. 2 is illustrated in FIG. 3. The voltage is illustrated as standardized voltage $U/\hat{U}$ and plotted against the angle position of the crankshaft 4, i.e., against crank angle ° CA.

The configuration and design of the generator 16 is matched to a crankshaft revolution in such a way that the period duration T of one oscillation of the voltage signal S corresponds to the n-th portion of a crankshaft revolution. In the illustrated embodiment according to FIG. 3, n is a number greater than 3, preferably 6. It can be expedient to provide greater numbers up to 12 or even greater. The number of poles is limited because of the small size of the generator that provides power between 20 to 200 watts.

When the period duration T of the voltage signal S is designed as one sixth of the crankshaft revolution, the period duration T is equal to 60° CA. Correspondingly, a revolution of the crankshaft (360° CA) is divided into six crankshaft angle intervals I, II, III, IV, V, and VI as illustrated in the bar at the top of FIG. 3 and in FIG. 4 as a circle diagram.

Each pole 22 of the alternating current generator 16 effects a complete oscillation with positive and negative half waves wherein the oscillations adjoin one another without gap. This results in a continuous alternating voltage signal with a continuous curve in accordance with FIG. 3. For the division into six crankshaft angle intervals I to VI, there are thus twelve zero crossings N1 to N12 of the voltage signal S wherein each crankshaft angle interval I to VI is divided into two zero position intervals $N_i$, for example, N1 and N2. The zero position interval $N_i$ is defined by two sequential zero crossings $O_i$ and $O_{i+1}$ of the voltage signal S. The crankshaft angle intervals I to VI or the zero position intervals N1 to N12 derived therefrom are evaluated by the signal processing unit 18 and transformed into a corresponding interval engine speed $n_1, n_2, n_3, \ldots n_{12}$. Each zero position interval $N_i$ thus has correlated therewith an interval engine speed $n_i$.

Figure 4:
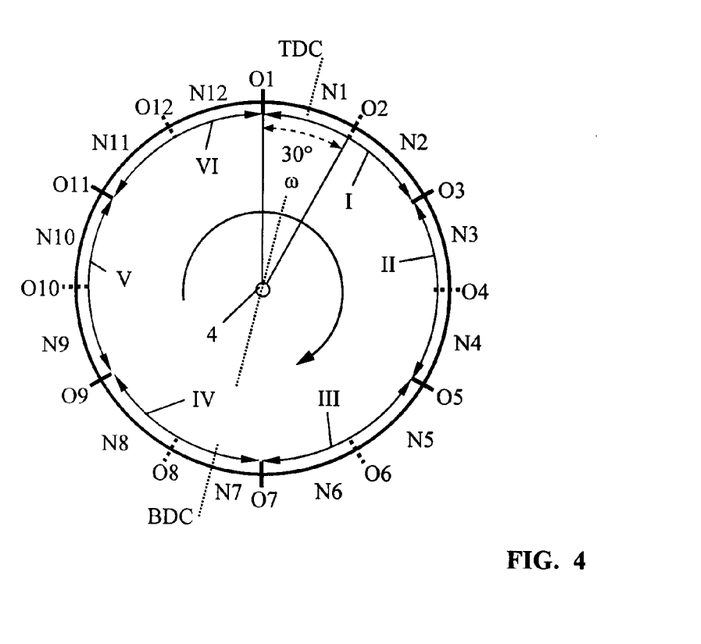
FIG. 4 is a schematic illustration of a crankshaft revolution with correlation of the zero crossings of the voltage signal in accordance with FIG. 3.

In FIG. 4, the correlation of the respective crankshaft angle intervals I to VI and of the zero position intervals N1 to N12 is illustrated as well as the zero crossings O1 to O12. FIG. 4 illustrates that the spacing of two zero crossings, for example, O1 and O2, is precisely 30° CA. Based on this relation, the angular speed ω of the crankshaft 4 at the zero position interval $N_i$ can be derived.

Expediently, the adjustment is selected such that a zero crossing $O_i$ of the induced alternating voltage signal S is preferably approximately 15° CA before top dead center TDC of the piston. In this way, it is also achieved that, when starting the internal combustion engine, a branch of the half wave can be used as a voltage supply for the electronics so that the system is operational during start of the engine at an early point in time even without a battery. This provides beneficial starting conditions.

Figure 5:
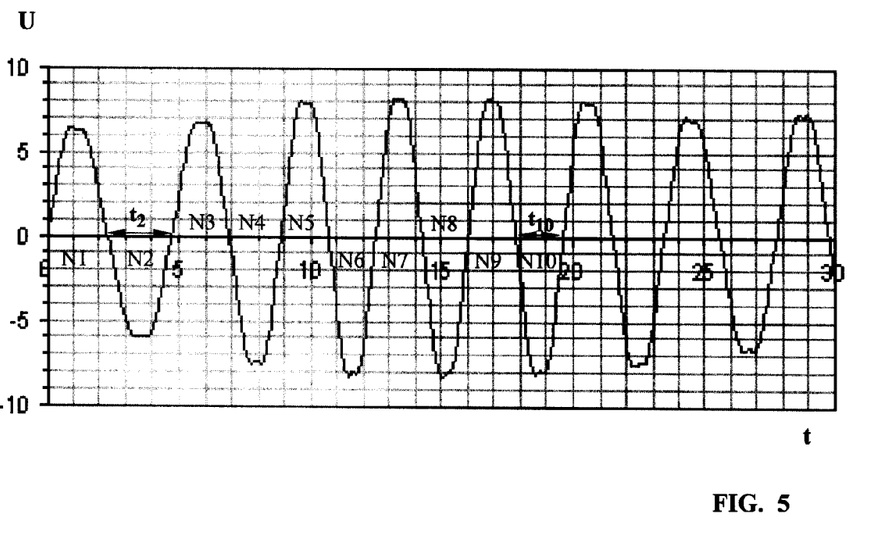
FIG. 5 is a real alternating voltage signal of an alternator according to FIG. 2.

In FIG. 5, the voltage signal U of the alternating current generator 16 in operation of the internal combustion engine 1 is plotted against the time t. This illustrates that the illustrated zero position intervals N1, N2, . . . are different, i.e., the time t2 of the zero position intervals N2 is significantly greater than the time t10 of the zero position interval N10. Accordingly, the engine speeds vary with regard to the corresponding intervals.

Figure 6:
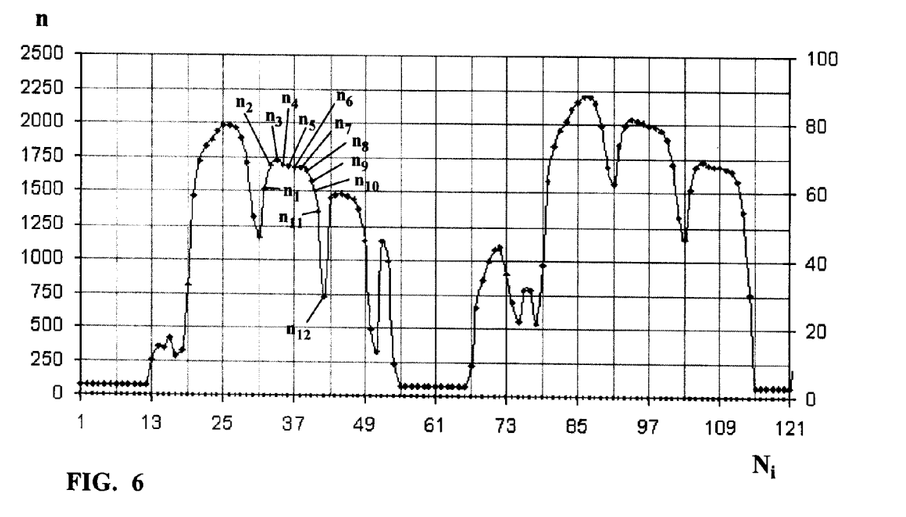
FIG. 6 shows an engine speed course of an internal combustion engine with signal generator, wherein the engine speed course is derived from interval engine speeds.

When the interval engine speeds $n_i$ are plotted against the intervals $N_i$, an engine speed course according to FIG. 6 results for an engine start. The calculated interval engine speeds $n_1$ to $n_{12}$ are shown in FIG. 6 for one crankshaft revolution. The engine speed course of the interval engine speeds is very pronounced in accordance with the operating state of the internal combustion engine 1 in a plot against the number of angle intervals (FIG. 6). When looking at the engine speed course for at least one complete revolution of the crankshaft 4, different characteristic features can be filtered out wherein each characteristic feature can be assigned to a certain operating parameter of the internal combustion engine 1 and/or of the power tool driven by the internal combustion engine. Based on the engine speed course of the determined interval engine speeds, in connection with the known constructive features of the internal combustion engine, it is possible, for example, to perform a simple determination of the crankshaft angle position, to detect the operating load of the internal combustion engine, or to determine with sufficient precision the throttle position of a carburetor. Also, the course of the combustion in the combustion chamber 5 of the internal combustion engine 1 can be monitored in accordance with certain criteria; also, for example, the richness of the fuel/air mixture can be checked. The load of the internal combustion engine, the air demand or the fill of the combustion chamber, the lambda value of combustion, glow ignition, knocking, dieseling, four-stroke operation, acceleration, torsional vibrations or similar transient and/or stationary operating states can be detected. In this connection, independent of the actual angle position ° CA of the crankshaft 4 when the crankshaft begins to rotate the engine speed course of the interval engine speeds $n_i$ can be evaluated and the crankshaft angle position can be determined. This determination of the crankshaft angle position is realized already during the first crankshaft revolution because the characteristic features of the engine speed curve, for example, caused by compression in the area of the top dead center TDC, opening of the exhaust 9, or opening of the transfer passage 14 are pronounced within the fixedly correlated crankshaft angle interval or zero position interval. With one and the same engine speed course several different operating parameters of the internal combustion engine 1 can be determined and, for example, supplied for evaluation to a diagnostic and/or servicing device 30 (FIG. 1). Select determined operating parameters can be saved in a nonvolatile data memory of the diagnostic and/or servicing device 30 in order to be retrieved later on during servicing in a shop, for example.

According to the first embodiment of the invention, the engine speed course of the interval engine speeds $n_i$ can be scanned with regard to a pronounced engine speed minimum $n_{12}$ wherein in the corresponding crankshaft angle interval N12 of the engine speed minimum $n_{12}$ the crankshaft angle position can correspond approximately to the position of the piston 6 at top dead center TDC. For a quicker and more precise determination of the angle position of the crankshaft, the polarity of the voltage signal S in each zero position interval, in particular also in the zero position interval N12, can be evaluated additionally. Relative to the idealized illustration of FIG. 3, the zero position intervals N1 to N12 can be differentiated easily by the control electronics because the zero position intervals N1, N3, N5, N7, N9, and N11 have a positive half wave and the other zero position intervals have a negative half wave.

When the angle position of the alternating current generator 16, i.e., in the illustrated embodiment according to FIG. 2, the angle position of the coil body 20 forming the stator 27, is selected such that the zero crossing O12 of the voltage signal S is positioned at top dead center TDC of the piston 6, a simple determination of the crankshaft angle ° CA can be realized.

Figure 7:
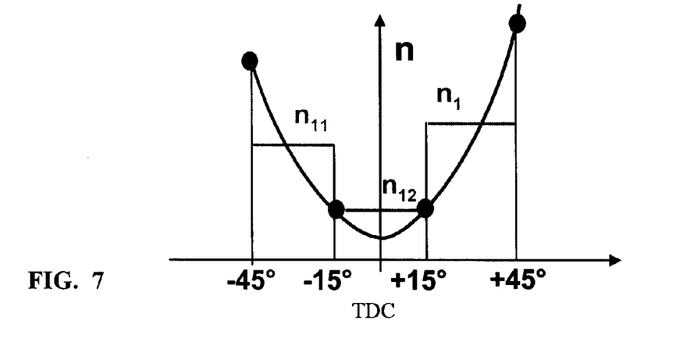
FIG. 7 is a schematic illustration of the angle position of the signal generator relative to an engine speed minimum.

It can be expedient to adjust the angle position of the stator 27 in such a way that the zero position interval N12 of the engine speed minimum $n_{12}$ in accordance with FIG. 7 is symmetric to the engine speed minimum itself so that by a simple comparison of the neighboring interval engine speeds the engine speed minimum can be determined without great computational expenditure. The following applies:

$$n_{11} > n_{12} < n_1.$$

Figure 8:
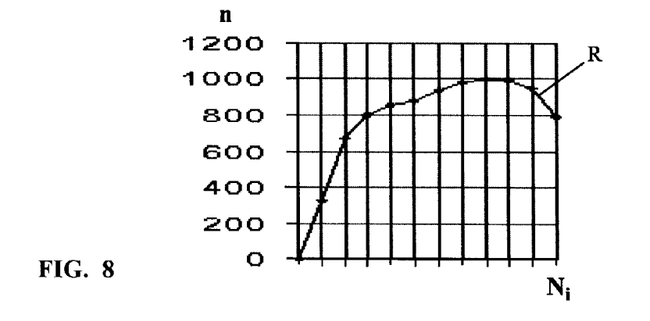
FIG. 8 shows a reference curve of an engine speed course.

The engine start of an internal combustion engine according to FIG. 1 shows a characteristic engine speed acceleration that always occurs within the same sections. When, based on a plurality of engine starts, a reference curve in accordance with FIG. 8 is determined, the crankshaft angle position can be detected in a simple way based on the reference curve. For this purpose, the determined interval engine speeds are standardized ($n_{standard}$) and compared to the reference engine speed $n_{ref}$ of the corresponding interval $N_i$. The difference between the standardized interval engine speed $n_{standard}(i) - n_{ref}(i)$ is utilized for calculation of a sum check error, squared and added for the last twelve intervals, wherein the thus determined sum check error e is always substantially zero when the piston is in the area of the top dead center TDC. The following applies:

$$e = \sum_{i=1}^{12} (n_{standard}(n_{standard}(i) - n_{ref}(i))^2$$

Figure 9:
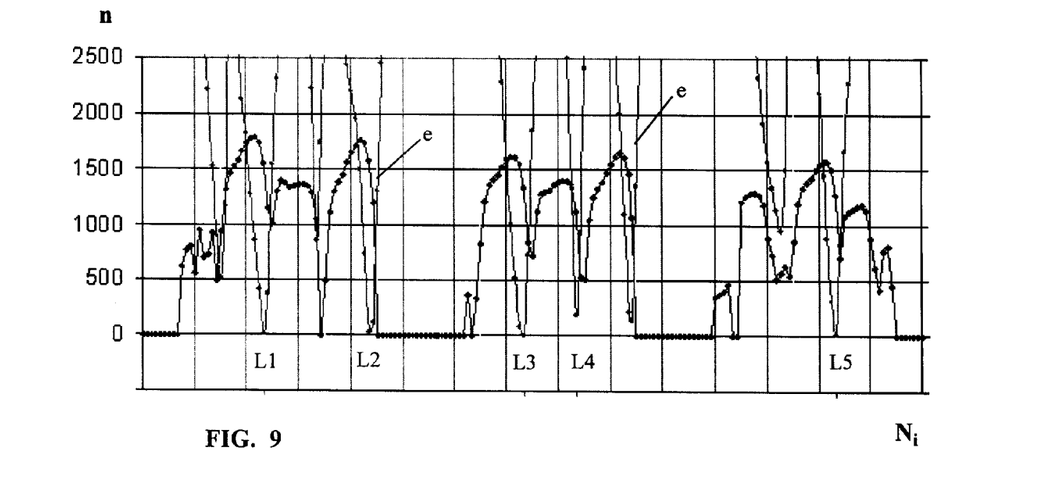
FIG. 9 shows the engine speed course of an internal combustion engine during engine start with superimposed sum check error relative to a reference curve in accordance with FIG. 8.

In FIG. 9, the position of the piston and thus the angle position of the crankshaft 4 is therefore safely detected within the intervals L1, L2, L3, L4, and L5 and the ignition device 19 is controlled accordingly.

Figure 10:
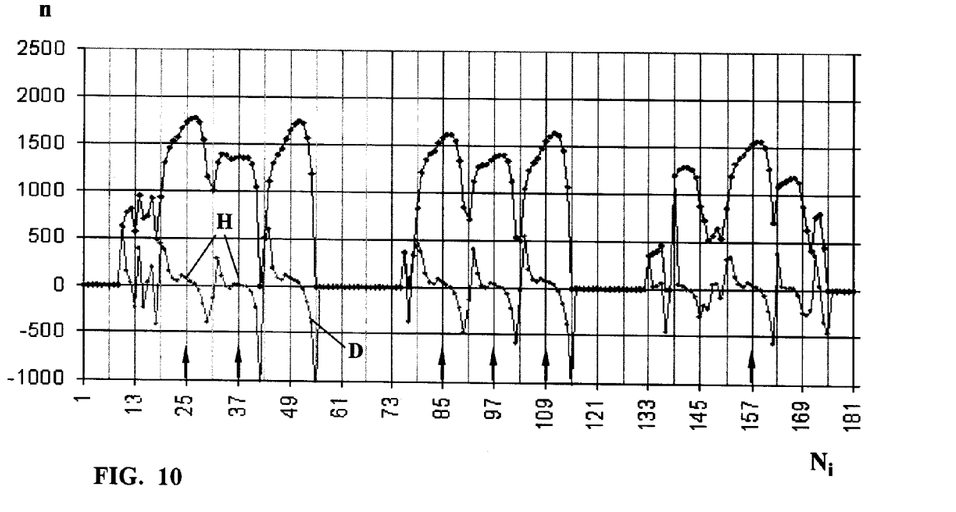
FIG. 10 shows the engine speed course of an internal combustion engine during engine start with superimposed differential engine speed course.

For recognizing the characteristic features of the engine speed course, in the embodiment according to FIG. 10 the engine speed course has been analyzed and the derived differential curve D is shown. Advantageously, this is not a mathematical differentiation because this would be a very complex mathematical task. In approximation, the same result is obtained when the engine speed change for each zero position interval is evaluated. The following applies:

$$n = \frac{\Delta \alpha}{\Delta t} \Rightarrow n' = \Delta n(i \rightarrow i+1)$$

Since a zero position interval extends across 30° CA, $\Delta t$ is detected by measuring the time. The thus obtained differential curve has in a correlated interval of the crankshaft angle ° CA a characteristic hook H that enables an unequivocal correlation of the mechanical crankshaft angle.

Figure 11:
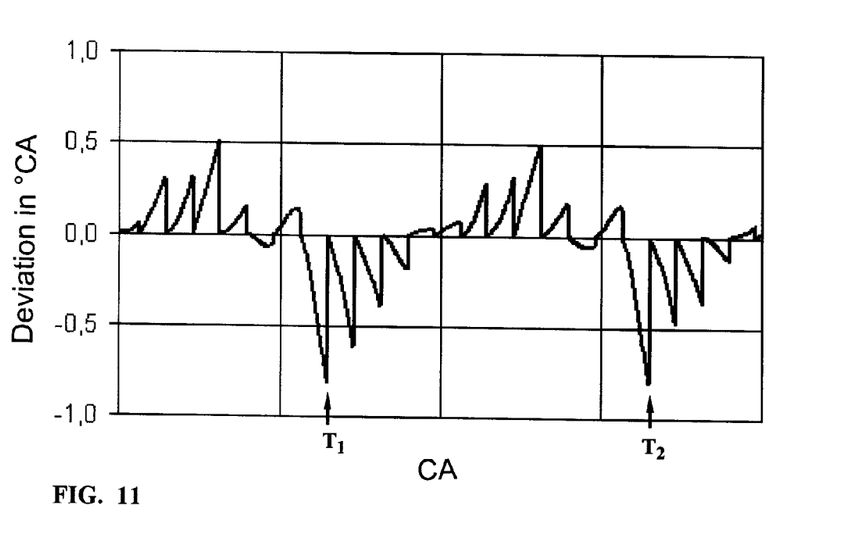
FIG. 11 shows the course of the angle error for extrapolation of the angle position from a zero position to the next zero position.

In the embodiment according to FIG. 11, an extrapolation of the crankshaft angle position based on a zero crossing $O_i$ is carried out; in this connection it has been found that until reaching the next zero crossing angle errors can be detected that are reset to zero when reaching the zero crossing. The orientation of the angle error of the extrapolation provides information in regard to compression or expansion wherein a maximum error occurs after complete combustion, i.e., at a point in time where the delay (based on compression) is changing to acceleration (as a result of combustion). The following applies:

$$\alpha(t_0 + \Delta t) = \alpha(t_0) + \omega(n_0) \cdot \Delta t$$

FIG. 11 shows that the angle error is very pronounced and a correlation to a crankshaft angle interval in the area of the top dead center TDC of the piston 6 is possible, i.e. at the time $T_1$, $T_2$.

In order to determine the angle position more precisely, the angle position of the alternating current generator 16, i.e., the angle position of the stator 20, is provided such that a zero crossing $O_i$ of the voltage signal S is located at an angle position of the crankshaft 4 that is approximately before the ignition timing range. Preferably, the angle position of the alternating current generator 16 is adjusted such that the zero crossing $O_i$ is directly before the ignition timing range of the internal combustion engine 1.

Figure 12:
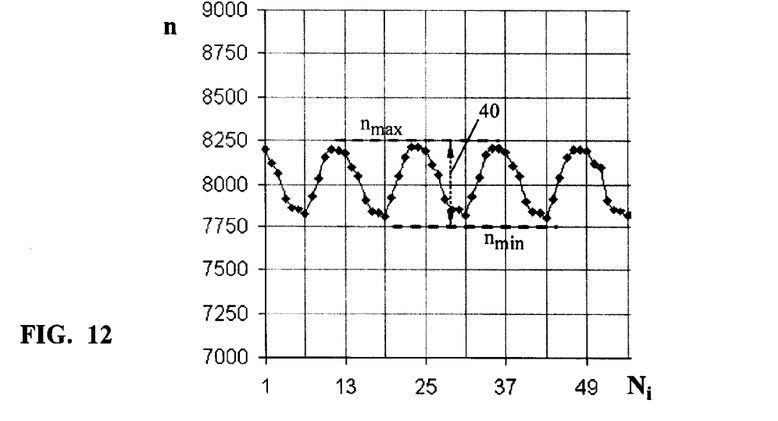
FIG. 12 shows the engine speed course during operation of the internal combustion engine at full load.
Figure 13:
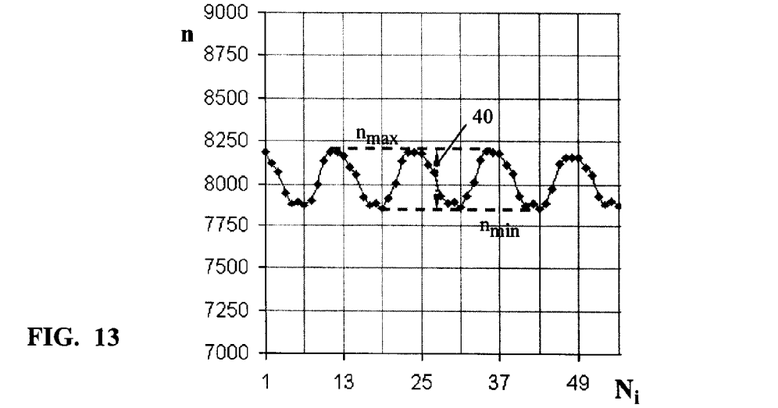
FIG. 13 is an illustration of the engine speed course at partial load.

In the embodiment according to FIGS. 12 and 13, based on the engine speed course of the interval engine speeds a load recognition is possible without requiring that a fixed angle position of the crankshaft must be known. The spread 40 between a maximum interval engine speed $n_{max}$ and a minimum interval engine speed $n_{min}$ of a crankshaft revolution is to be evaluated as a criterion for a load that is present at the internal combustion engine 1. For a constant engine speed the spread 40 between minimum and maximum engine speeds $n_{min}$ and $n_{max}$ will increase with increasing load. In order to suppress engine speed fluctuations, the spread 40 can be determined as an average value of several sequential crankshaft revolutions and can be compared, for example, to a typical known reference spread of the engine. In this way, it is possible to deduce for a large spread 40 that a load is present and for a small spread that a partial load or a load-free state is present.

Expediently, the ratio of maximum engine speed or minimum engine speed to the average engine speed can be utilized or the engine speed gradient of compression and expansion can be compared in order to derive therefrom load information.

Figure 14:
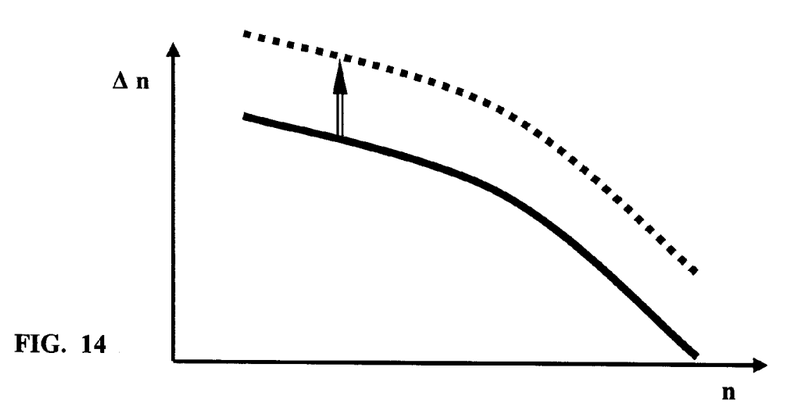
FIG. 14 shows the drop in engine speed for an open throttle valve and closed throttle valve of a carburetor.

In the embodiment according to FIG. 14, the fact is utilized that, for example, during idle at closed throttle valve the engine speed drop to be derived from sequential crankshaft revolutions are engine speed-dependent. The curve of the engine speed drop is within a band that can be detected and is a characteristic machine parameter.

When the throttle valve is opened and thus the fill of the combustion chamber is enlarged, the compression work will increase. The curve of the engine speed drop (dotted illustration) is positioned for compression with open throttle valve above the curve of the engine speed drop (solid line) at closed throttle valve. In this way, independent of the current idle speed opening of the throttle valve can be recognized based on the course of the engine speed drop and the displacement within the coordinate system Δn/n.

Figure 15:
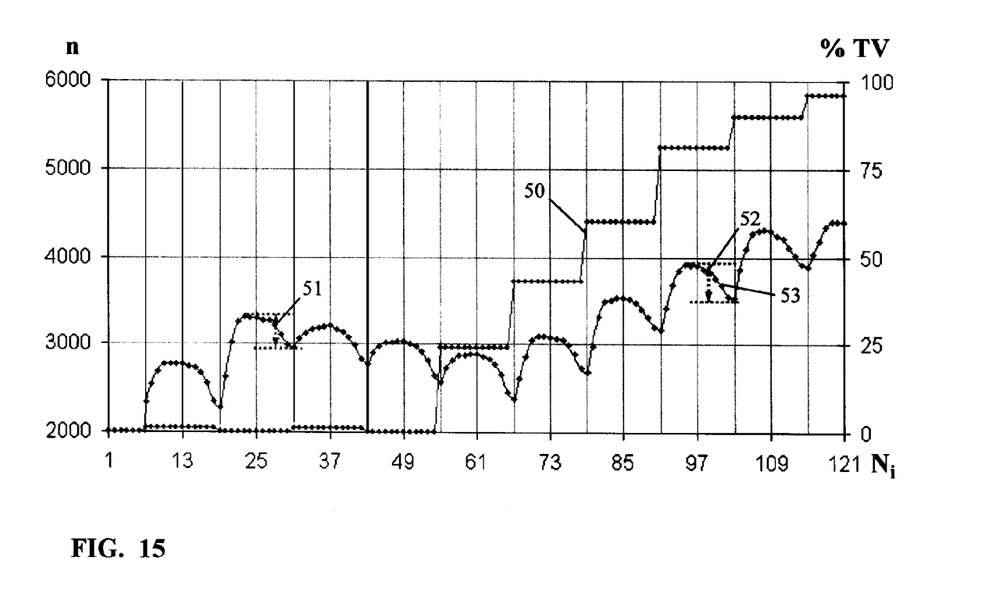
FIG. 15 shows the engine speed course in operation of the internal combustion engine with illustration of the degree of opening of the throttle valve.

In the embodiment according to FIG. 15, the compression work of the piston 6 is evaluated as a function of the opening position of the throttle valve 10a. The engine speed course of the interval engine speeds illustrated in FIG. 15 represents an internal combustion engine in operation wherein the stepped curve 50 illustrates the opening position of the throttle valve illustrated as % TV (100% TV=throttle valve open; 0% TV=throttle valve closed).

In cycles without combustion, for closed throttle valve 10a the compression work of the piston 6 is significantly reduced; this can be detected based on the height 51 of the descending branch of the engine speed course plotted against crankshaft revolution. When the throttle valve is opened at approximately 80%, as illustrated to the right in FIG. 15, in cycles without combustion the height 52 of the descending branch 53 is significantly greater. The compression work has changed. The engine speed course of the interval engine speeds $n_1$ to $n_{12}$ shows thus as a characteristic feature the opening position of the throttle valve 10a without this requiring position sensors.

Figure 16:
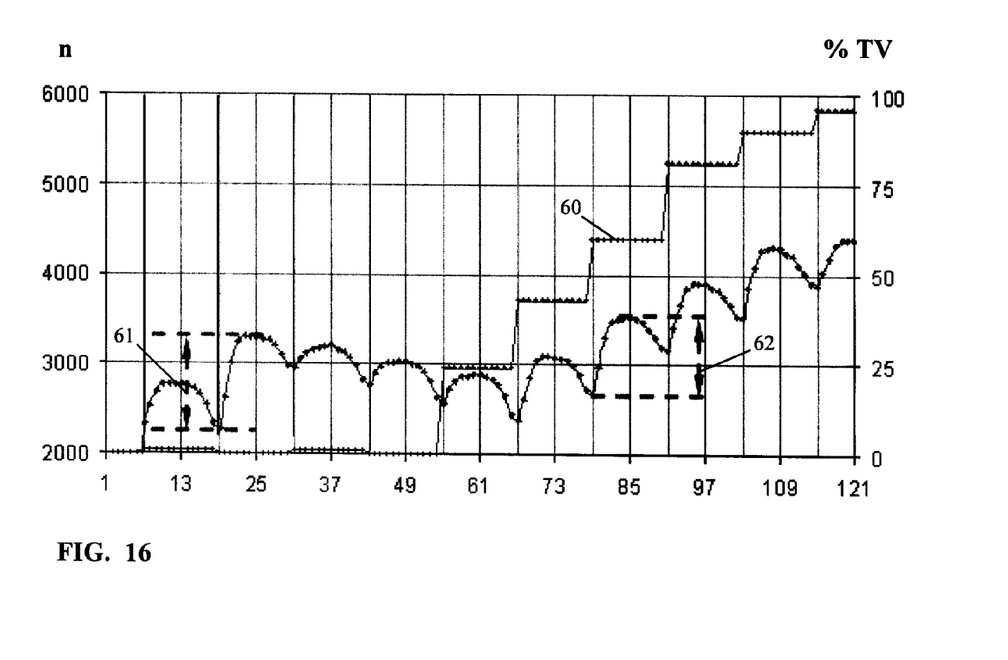
FIG. 16 is an illustration similar to FIG. 15 of the engine speed course of the internal combustion engine.

In the embodiment according to FIG. 16, the acceleration in the working stroke that can be recognized in the engine speed course of the interval engine speeds is evaluated. The stepped curve 60 represents the opening of the throttle valve 10a in percent (% TV) while the engine speed course of the interval engine speeds reflects the operation of the internal combustion engine. The engine speed lift 61 at idle (throttle valve closed; 0% TV) as illustrated in the left part of FIG. 16 is significantly greater than the engine speed lift 62 when the throttle valve 10a is approximately 60% open. When the throttle valve 10a is open (100% TV), the engine speed lift 62 is significantly smaller than the engine speed lift 61 at idle. By repeated comparison of the engine speed lifts after successful combustion it is thus possible, without requiring additional sensors, to derive information in regard to the load state of the internal combustion engine or the positioning of the throttle valve 10a. This holds true also for the ascertainable fact that sequential combustion actions have taken place. It can also be expedient to determine the engine speed lift after combustion and to determine the ratio relative to the stoichiometry of the supplied fuel/air mixture for combustion; the fuel/air mixture for combustion can thus be controlled based on the engine speed lift.

Figure 17:
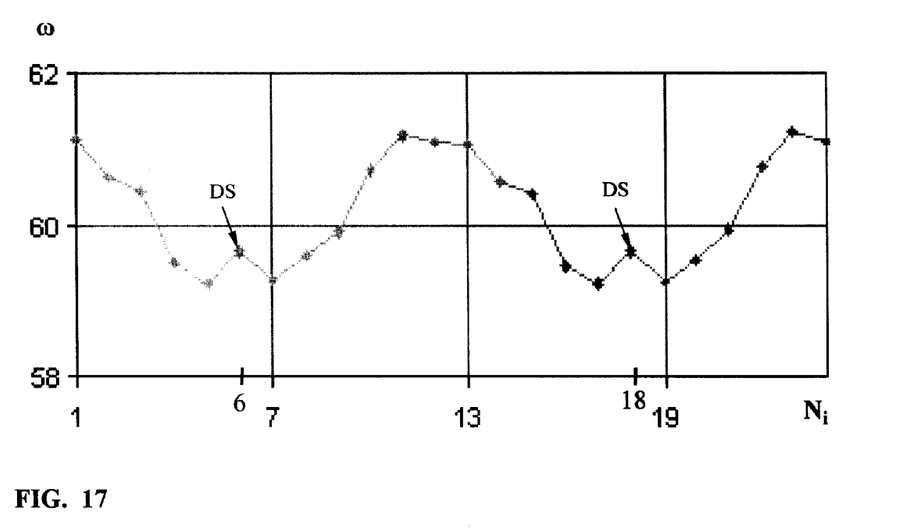
FIG. 17 is an illustration of the angular speed of the crankshaft in operation with pronounced torsional vibration in the drive train.

In the embodiment according to FIG. 17 it is illustrated how a torsional vibration in the drive train of the internal combustion engine can be detected. In certain operating states, torsional vibrations of the crankshaft and the drive train are superimposed on non-uniform rotations caused by compression and expansion. When the angle speed ω of the crankshaft 4 is plotted against the angle intervals $N_i$, the non-uniform rotations based on changing compression and expansion becomes clearly visible. As shown in FIG. 17, in the interval $N_i$=6 of one crankshaft revolution or in the subsequent interval $N_i$=18, i.e., in the next crankshaft revolution, a pronounced superimposed torsional vibration DS can be detected so that the signal processing unit can intervene in the ignition process such that operating states with superimposed torsional vibrations DS can be avoided by means of active engine speed change in a targeted way or can be disturbed in a targeted way by means of special ignition patterns.

In special situations it can be expedient to set a mark M for increasing the safety of recognition of the crankshaft angle position as indicated in FIG. 2. This mark M can be in the form of a deviating design of the pole 22 causing a pronounced signal course that can be detected easily by the control electronics. Such enhancing auxiliary signals can further simplify the configuration or can be utilized for providing redundancy of the operating parameter determination.

The generator signals can also be supplied to a conventional ignition system wherein the signal evaluation according to the invention is utilized advantageously for the ignition timing control in the conventional system. The high-voltage generation can be realized in the conventional way.

In order to prevent a possible load effect on the position of the zero crossings $O_i$ in the case of an electrically loaded alternator, it can be expedient to power off principally an electrical load connected to the alternator in the area of a zero crossing $O_i$; a load is then supplied with power from the alternator only in the interval between two zero crossings. As a result of the alternator being thus load-free at the time of zero crossing $O_i$, possible inductive and capacitive signal displacements are eliminated. Powering off the load from approximately 5° CA before an expected zero crossing $O_i$ to approximately 1° CA after this zero crossing $O_i$ has been found to be expedient.

Figure 18:
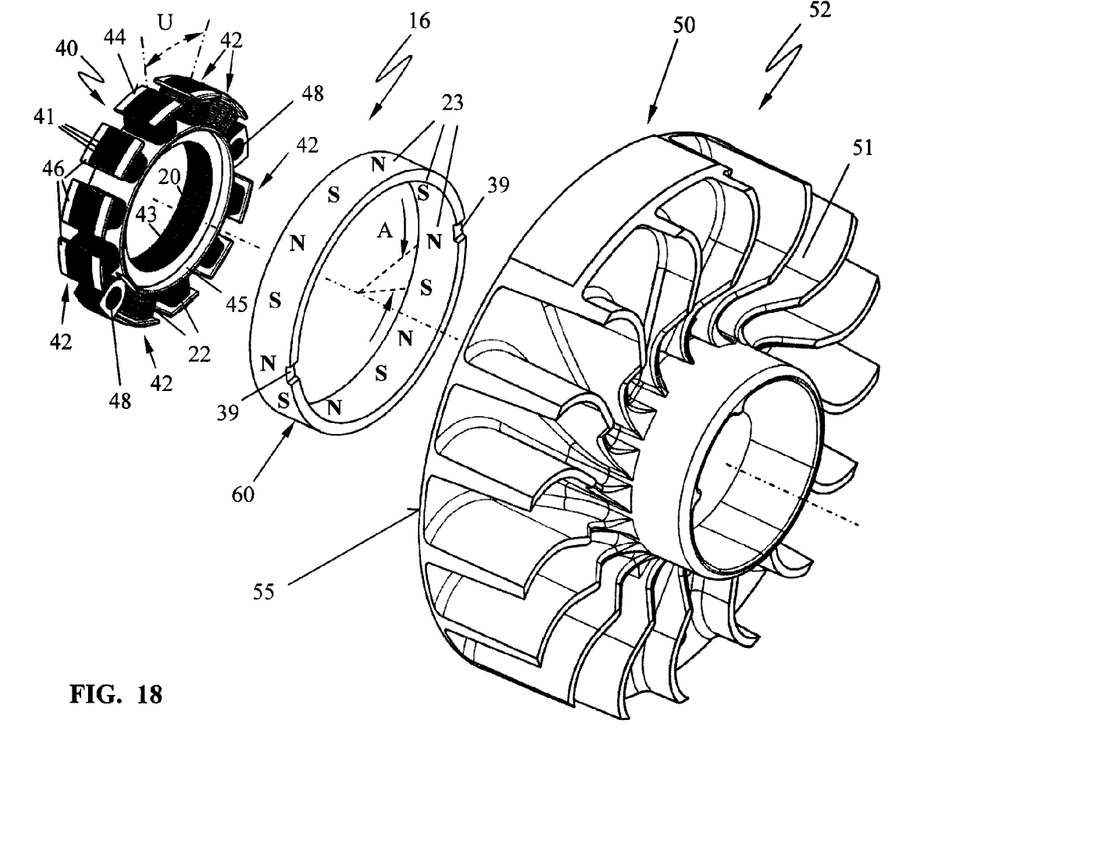
FIG. 18 is a schematic illustration of an alternator embodied as a radial alternator.

In the embodiment according to FIG. 18, a signal generator 16 is configured as a radial alternator. The alternator 16 has poles 22 that are oriented radially in a star shape. The coil support 20 of the stator 40 is comprised of a lamination pack 43 of individual sheet metal laminations 41 wherein the individual laminations 41 are stacked axially. The lamination pack has individual post-shaped coil supports that extend radial outwardly to the outer circumference 44. The posts form individual poles 42 and serve as supports of induction coils 22 of which at least one is arranged on each of the post-shaped supports. In the illustrated embodiment a total of twelve posts are provided that are spaced relative to one another in the circumferential direction at an identical spacing U of preferably 30°.

For attaching the stator 40, two axial fastening openings 48 are provided in two of the posts that are positioned approximately opposite one another; the fastening openings 48 penetrate the sheet metal laminations 41 and are provided for receiving fastening screws with which the stator 40 is fixedly mounted, for example, on the crankcase 3 (FIG. 1). The posts with the fastening openings 48 have no coil. The stator 40 is advantageously embedded (potted) for which purpose a cylindrical base plate 45 is attached to the base of the post-shaped poles 42; this base plate 45 projects axially past the end faces of the lamination pack 43. Accordingly, the free ends of the posts support end plates 46 whose axial length corresponds to the axial height of the cylindrical base plate 45. The space between the base plate 45 and the end plates 46 is filled with a potting compound or the like. In this way, the coils are secured on the individual post-shaped poles 42 and secured against mechanical damage.

The position of the posts with the fastening openings 48 is selected such that, in the circumferential direction, on one side four poles 42 and on the other side six poles 42 are positioned between them. The summation signal of the coils 22 connected to one another corresponds to the alternating signal S as illustrated in FIG. 3 or FIG. 5.

The rotor 52, as in the embodiment according to FIG. 2, is comprised of a wheel member 50 that, in the illustrated embodiment. is a fan wheel 51 of an internal combustion engine. On the side facing the stator 40, a receiving cup 55 is formed on the fan wheel 51 into which a magnet ring 60 is inserted that, in the circumferential direction, is magnetized alternatingly as a north pole N and a south pole S at identical spacings A to one another. In this way, about the circumference twelve permanent magnets 23 are created.

For ensuring a correct rotational position of the magnet ring 60 in the receiving cup 55 of the rotor 52, locking grooves 39 are provided at one end face. The position of the magnet ring 60 relative to the position of the crankshaft is determined by means of these locking grooves 39.

In the mounted state, the inner circumference of the unitary magnet ring 60 is positioned at a minimal spacing about the outer circumference 44 of the stator 40. The stator 40 is positioned completely within or inside the magnet ring 60. When the rotor 52 rotates, the alternating magnetization of the magnet ring 60 causes alternating flux in the poles 42 so that an alternating voltage signal S is induced as illustrated in FIGS. 3 and 5.

The specification incorporates by reference the entire disclosure of German priority document 10 2006 038 283.8 having a filing date of 16 Aug. 2006.

While specific embodiments of the invention have been shown and described in detail to illustrate the inventive principles, it will be understood that the invention may be embodied otherwise without departing from such principles.

What is claimed is:

1. A method for detecting an operating parameter of a power tool comprising an internal combustion engine, wherein the internal combustion engine comprises at least one cylinder and a crankcase, wherein a combustion chamber is defined in the cylinder and is delimited by a piston, wherein the piston drives in rotation a crankshaft supported rotatably in the crankcase, wherein an intake is provided that supplies combustion air to the combustion chamber and an exhaust is provided for removing combustion gases from the combustion chamber, wherein an alternating current generator is provided that is driven in rotation by the crankshaft and emits for one crankshaft revolution sequential alternating voltage signals, the method comprising the steps of:

selecting a period duration of a voltage signal so as to correspond to the n-th portion of a crankshaft revolution with n being a number greater than 2, wherein the n-th portion of the crankshaft revolution forms a crankshaft angle interval;

detecting for each crankshaft angle interval at least one information, wherein the at least one information of the crankshaft angle interval is plotted against the crankshaft angle to represent a course of the at least one information across the crankshaft angle;

scanning the course of the at least one information with regard to a characteristic feature;

correlating the characteristic feature with an operating parameter of the power tool;

wherein the at least one information is the interval engine speed and represents an engine speed course across at least one complete revolution of the crankshaft, wherein the engine speed course is scanned with regard to the characteristic feature.

2. The method according to claim 1, wherein, independent of an angle position of the crankshaft, the engine speed course is calculated and evaluated as the crankshaft begins to rotate.

3. The method according to claim 1, wherein the engine speed course is scanned with regard to a pronounced engine speed minimum, wherein the crankshaft angle interval of the engine speed minimum is correlated with a predetermined crankshaft angle position.

4. The method according to claim 3, wherein the predetermined crankshaft angle position is correlated with top dead center of the piston.

5. The method according to claim 1, further comprising the steps of differentiating the interval engine speeds to a differential curve and assigning to the crankshaft angle interval having a characteristic hook in the differential curve a characteristic crankshaft angle position.

6. The method according to claim 1, further comprising the step of evaluating a spread between a maximum interval engine speed and a minimum interval engine speed of the engine speed course as a criterion for a load on the power tool.

7. The method according to claim 6, wherein the spread is evaluated within one crankshaft revolution.

8. The method according to claim 1, further comprising the step of determining the engine speed lift for successful combustion and comparing the engine speed lift to a reference value, wherein the throttle valve of a carburetor is closed when the engine speed lift surpasses the reference value and the throttle valve of the carburetor is open when the engine speed lift is below the reference value.

9. The method according to claim 1, further comprising the step of detecting the engine speed lift after combustion and generating a ratio relative to a stoichiometry of a supplied fuel/air mixture and controlling the composition of the fuel/air mixture in accordance with the engine speed lift.

10. The method according to claim 1, wherein the operating parameter is a load on a tool, an operating state of a heater, an operating state of a valve, or wear of a tool.

11. The method according to claim 1, wherein the operating parameter is an operating parameter of the internal combustion engine.

12. The method according to claim 11, wherein the operating parameter of the internal combustion engine is a crankshaft angle position, an operating load, a throttle valve position of a carburetor, a course of combustion, or a richness of the fuel/air mixture.

13. The method according to claim 12, wherein several operating parameters of the internal combustion engine are detected and supplied to a diagnostic and servicing device.

14. The method according to claim 13, further comprising the steps of selecting and saving in a non-volatile memory one of the operating parameters of the internal combustion engine.

15. The method according to claim 1, further comprising the step of dividing the crankshaft angle interval into two zero position intervals, wherein the zero position interval is the time between two sequential zero crossings of the voltage signal, and calculating the interval engine speed relative to the zero position interval.

16. The method according to claim 15, comprising the step of determining the zero crossings in a load-free state of the alternating current generator.

17. The method according to claim 16, wherein a current flow to an electrical load connected to the alternating current generator is stopped at the time of zero crossing of the alternating voltage signal.

18. The method according to claim 16, wherein the current flow is stopped for a duration of passing from approximately 5° CA before a zero crossing to approximately 1° CA after said zero crossing.

19. The method according to claim 1, wherein the number n is an integer.

20. The method according to claim 19, wherein the number n is between 3 and 12.

21. The method according to claim 19, wherein the number n is between 5 and 7.

22. The method according to claim 1, further comprising the step of evaluating the polarity of the voltage signal in the crankshaft angle interval for determining the crankshaft angle position.

23. The method according to claim 1, further comprising the step of adjusting the angle position of the alternating current generator such that the crankshaft angle interval of an engine speed minimum is symmetric to said engine speed minimum.

24. The method according to claim 1, further comprising the step of selecting an angle position of the alternating current generator such that a zero crossing of a voltage signal is positioned in an angle position of the crankshaft approximately before the ignition timing range.

25. The method according to claim 24, wherein the zero crossing is positioned in an angle position of the crankshaft directly before the ignition timing range.

26. The method according to claim 1, wherein the angle position of the alternating current generator on the motor unit and the top dead center of the piston are adjusted relative to one another such that a zero crossing of the alternating voltage signal is approximately 15° CA before the top dead center of the piston.

27. A method for detecting an operating parameter of a power tool comprising an internal combustion engine, wherein the internal combustion engine comprises at least one cylinder and a crankcase, wherein a combustion chamber is defined in the cylinder and is delimited by a piston, wherein the piston drives in rotation a crankshaft supported rotatably in the crankcase, wherein an intake is provided that supplies combustion air to the combustion chamber and an exhaust is provided for removing combustion gases from the combustion chamber, wherein a signal generator is provided that is driven in rotation by the crankshaft and emits for one crankshaft revolution sequential alternating voltage signals, the method comprising the steps of:

selecting a period duration of a voltage signal so as to correspond to the n-th portion of a crankshaft revolution with n being a number greater than 2, wherein the n-th portion of the crankshaft revolution forms a crankshaft angle interval;

detecting for each crankshaft angle interval at least one information, wherein the at least one information of the crankshaft angle interval plotted against the crankshaft angle represents a course;

scanning the course derived from the at least one information with regard to a characteristic feature;

correlating the characteristic feature with an operating parameter of the power tool;

wherein the at least one information is the interval engine speed representing an engine speed course across at least one complete revolution of the crankshaft and wherein the engine speed course is scanned with regard to the characteristic feature; and     further comprising the steps of comparing the engine speed course to a reference curve, wherein deviations from the reference curve are detected as a sum check error and, to the crankshaft angle interval having a smallest sum check error, a predetermined crankshaft angle position is assigned.

28. A method for detecting an operating parameter of a power tool comprising an internal combustion engine, wherein the internal combustion engine comprises at least one cylinder and a crankcase, wherein a combustion chamber is defined in the cylinder and is delimited by a piston, wherein the piston drives in rotation a crankshaft supported rotatably in the crankcase, wherein an intake is provided that supplies combustion air to the combustion chamber and an exhaust is provided for removing combustion gases from the combustion chamber, wherein a signal generator is provided that is driven in rotation by the crankshaft and emits for one crankshaft revolution sequential alternating voltage signals, the method comprising the steps of:

selecting a period duration of a voltage signal so as to correspond to the n-th portion of a crankshaft revolution with n being a number greater than 2, wherein the n-th portion of the crankshaft revolution forms a crankshaft angle interval;

detecting for each crankshaft angle interval at least one information, wherein the at least one information of the crankshaft angle interval plotted against the crankshaft angle represents a course;

scanning the course derived from the at least one information with regard to a characteristic feature;

correlating the characteristic feature with an operating parameter of the power tool;

wherein the at least one information is the interval engine speed representing an engine speed course across at least one complete revolution of the crankshaft and wherein the engine speed course is scanned with regard to the characteristic feature; and     further comprising the steps of detecting in a first operating state a first continuous engine speed drop between sequential crankshaft revolutions; detecting in a subsequent second operating state a second continuous engine speed drop between sequential crankshaft revolutions; and comparing the second continuous engine speed drop of the second operating state to the first continuous engine speed drop of the first operating state, wherein for a position of the second engine speed drop below a curve of the first engine speed drop the throttle valve of a carburetor is closed and for a position of the second engine speed drop above the curve of the first engine speed drop the throttle valve of the carburetor is open.

* * * * *